United States Patent [19]

Nishimura et al.

[11] Patent Number: 5,345,908
[45] Date of Patent: Sep. 13, 1994

[54] ELECTRONIC CONTROL DEVICE FOR AN INTERNAL COMBUSTION ENGINE

[75] Inventors: Yukinobu Nishimura; Masanobu Uchinami, both of Himeji, Japan

[73] Assignee: Mitsubishi Denki Kabushiki Kaisha, Tokyo, Japan

[21] Appl. No.: 110,204

[22] Filed: Aug. 23, 1993

Related U.S. Application Data

[63] Continuation of Ser. No. 885,819, May 20, 1992, abandoned.

[30] Foreign Application Priority Data

Jul. 4, 1991 [JP] Japan .................. 3-164137

[51] Int. Cl.$^5$ ............................................. F02D 43/00
[52] U.S. Cl. ................................. 123/339; 123/424; 123/491; 123/422; 123/492
[58] Field of Search ............... 123/422, 424, 491, 494, 123/339, 406, 478

[56] References Cited

U.S. PATENT DOCUMENTS

| | | | |
|---|---|---|---|
| 3,750,635 | 8/1973 | Hoffman et al. | 123/357 |
| 4,438,749 | 3/1984 | Schwippert | 123/494 |
| 4,640,251 | 2/1987 | Harada et al. | 123/422 X |
| 4,703,732 | 11/1987 | Wineland et al. | 123/491 X |
| 4,920,494 | 4/1990 | Abo et al. | 123/435 X |
| 4,942,848 | 7/1990 | Terasaka | 123/494 X |
| 4,945,880 | 8/1990 | Gonze et al. | 123/1 A |

FOREIGN PATENT DOCUMENTS

| | | |
|---|---|---|
| 3621445 | 7/1987 | Fed. Rep. of Germany . |
| 4028594 | 3/1992 | Fed. Rep. of Germany . |
| 44496 | 10/1984 | Japan . |
| 5786 | 2/1985 | Japan . |
| 83339 | 6/1990 | Japan . |
| 204663 | 8/1990 | Japan . |

OTHER PUBLICATIONS

"Vehicle Operation With Variable Methanol/Gasoline Mixtures" by Weide and Wineland, VI International Symposium on Alcohol Fuels Technology, May 1984.

*Primary Examiner*—Tony M. Argenbright
*Attorney, Agent, or Firm*—Sughrue, Mion, Zinn, Macpeak & Seas

[57] ABSTRACT

An electronic control device for an internal combustion engine having a control unit for detecting a running state of an engine, and which controls a fuel quantity or an ignition timing of the engine in accordance with the running state, where the electronic control device monitors the transient running state of the engine, and includes a fuel property sensor for detecting a fuel property, such that the fuel quantity or the ignition timing is corrected in accordance with the fuel property under the transient running state.

3 Claims, 8 Drawing Sheets

FIGURE 6A
THROTTLE OPENING DEGREE (θ)

FIGURE 6B
ACCELERATION FLAG (F_ACC)

FIGURE 6C
ACCELERATION INCREASE (C_FACC)

FIGURE 6D
ACCELERATION RETARD ANGLE (C_IACC)

FIGURE 9A STARTING SWITCH

FIGURE 9B POST-STARTING COUNTER (CSTT)

FIGURE 9C STARTING FUEL QUANTITY (FSTT)

FIGURE 9D POST-STARTING FUEL CORRECTION VALUE (KFAS)

FIGURE 9E POST-STARTING IGNITION TIMING CORRECTION VALUE (KIAS)

FIGURE 9F STARTING AIR QUANTITY (ASTT)

FIGURE 9G POST-STARTING AIR QUANTITY CORRECTION VALUE (KAAS)

ELECTRONIC CONTROL DEVICE FOR AN INTERNAL COMBUSTION ENGINE

This is a continuation of application Ser. No. 07/885,819 filed May 20, 1992, now abandoned.

BACKGROUND OF THE INVENTION

1. Field of the Invention

This invention relates to an electronic control device for an internal combustion engine.

2. Discussion of the Background

A conventional transient state fuel control for an internal combustion engine detects acceleration of an engine based on a changing ratio of a throttle opening degree or a change of an intake quantity, increases a fuel supply quantity at acceleration initiation by an acceleration fuel increasing means, and afterwards, gradually reduces an acceleration fuel increasing quantity. Furthermore, as a modification of the acceleration fuel increasing quantity control, a device is known wherein the acceleration increasing quantity is kept constant in a predetermined time period instantly after the acceleration, as in, for instance, Japanese Examined Patent Publication No. 44496/1984. However, in those cases, the acceleration increasing quantity is based on the intake quantity, the throttle opening degree, an engine temperature and an engine revolution number, as parameters.

Next, in an ignition timing control for an internal combustion engine, a device is known wherein the acceleration of the engine is detected similarly by the change ratio of the throttle opening degree or the change of the intake air quantity, and a retard angle quantity of the ignition timing is increased upon acceleration. This control is especially effective to a device having a knocking detecting means, as in, for instance, Japanese Examined Patent Publication No. 5786/1985.

In any one of the fuel control or the ignition timing control of the conventional devices, no special consideration is given to property of fuel such that matching is performed so that an air-fuel ratio or the ignition timing in transient state is optimized with respect to a specified fuel.

Furthermore, in the fuel control at starting or at post-starting (just after starting) of the internal combustion engine, a device is known wherein a temperature of the engine is detected, and a fuel quantity at starting is determined in accordance with the temperature, or a fuel increasing value is determined in accordance with the engine temperature at starting, and the fuel increasing value is gradually reduced over time at the post-starting. In the ignition timing control at post-starting of an internal combustion engine, a device is known wherein the temperature of the engine is detected, and the ignition timing is controlled to an advance angle compared with a reference value, in accordance with the engine temperature.

Furthermore, in an idling air quantity control at starting or at post-starting of an internal combustion engine a device is known wherein the temperature of the engine is detected, and an air quantity at starting is determined in accordance with the temperature, or an air quantity increasing value is determined in accordance with the engine temperature at starting, and the increased value is gradually reduced over time at post-starting.

However, even in the fuel control, the ignition timing control and the idling air quantity control of the conventional devices at starting or at post-starting, no special consideration is given to the fuel property such that a matching is performed so that the fuel quantity, the ignition timing and the idling air quantity are optimized at starting and at post-starting, with respect to a specified fuel property.

Since in the conventional electronic control device for an internal combustion engine, no consideration is given the influence of a property difference of fuel on a control in transient time such as at starting or in the acceleration, in the fuel quantity control, the ignition timing control and the idling air quantity control, with respect to a fuel other than the specified fuel, a considerable deterioration of the control of the engine in transient time is caused and a malfunction results wherein the engine cannot be started or the engine is stopped just after starting.

Heavy gasoline is pointed out as a specific example wherein the difference in the fuel property becomes an issue. Heavy gasoline is a gasoline of which distillation temperature is high. As a characteristic feature, the vapor pressure (RVP) thereof is low, and the specific weight and the octane value thereof are high compared with those of a regular gasoline. As a standard, this gasoline is no different than normal gasoline, or with gasoline at a filling station such as a high-octane gasoline or a regular gasoline. The problems encountered in an electronic control device which performs the fuel control, the ignition timing control and the idling air quantity control that are matched to normal gasoline when running an engine filled with the heavy gasoline, are a hesitation at acceleration or an instability of an engine revolution number at starting and at post-starting, which results in the incapability of starting or engine stoppage at post-starting, and also worsening of exhaust gas. The cause of these problems is considered to be that, since the vapor pressure of the heavy gasoline is low, a substantial fuel supply quantity is reduced at the acceleration or at starting and at post-starting due to adhesion of fuel to an intake pipe, thereby increasing the air-fuel ratio and causing a defective combustion.

SUMMARY OF THE INVENTION

It is an object of the present invention to solve the above problems. It is an object of the present invention to provide an electronic control device for an internal combustion engine capable of preventing a defective control of the engine in transient time due to the difference in fuel property, and performing an optimum control matched with the fuel property.

According to the first aspect of the present invention, there is provided an electronic control device for an internal combustion engine having running condition detecting means for detecting a running state of an engine, which controls a fuel quantity or an ignition timing of the engine in accordance with the running state which comprises: transient running state detecting means for detecting a transient running state of the engine; fuel property detecting means for detecting a fuel property; and correcting means for correcting the fuel quantity or the ignition timing in accordance with the fuel property under the transient running state.

According to the second aspect of the present invention, there is provided an electronic control device for an internal combustion engine having running condition detecting means for detecting a running state of an engine, which controls a fuel quantity or an ignition timing or an air quantity in idling time of an engine in accordance with the running state which comprises: detecting means for detecting a starting state or a post-starting state of the engine; fuel property detecting means for detecting a fuel property; and correcting means for correcting the fuel quantity or the ignition timing or the air quantity in idling time in accordance with the fuel property under the starting state or the post-starting state.

In this invention, the fuel quantity or the ignition timing of the engine is corrected in accordance with the fuel property in case of a transient running state of the engine. For instance, a determination is performed on whether the gasoline is heavy or light. When it is a heavy gasoline, the increased component of the fuel quantity in transient time is more enhanced than in case of a light gasoline, and a retard angle quantity of the ignition timing is reduced.

Furthermore, in this invention, the fuel quantity, the ignition timing and the air quantity in idling time are corrected in accordance with the fuel property at starting or at post-starting of the engine. Accordingly, in case of a heavy gasoline, a fuel quantity is more increased than in case of a light gasoline, the ignition timing is corrected to an advance angle side, and the idling air quantity is increased.

DETAILED DESCRIPTION OF THE PREFERRED EMBODIMENT

EXAMPLE 1

Figure 1:
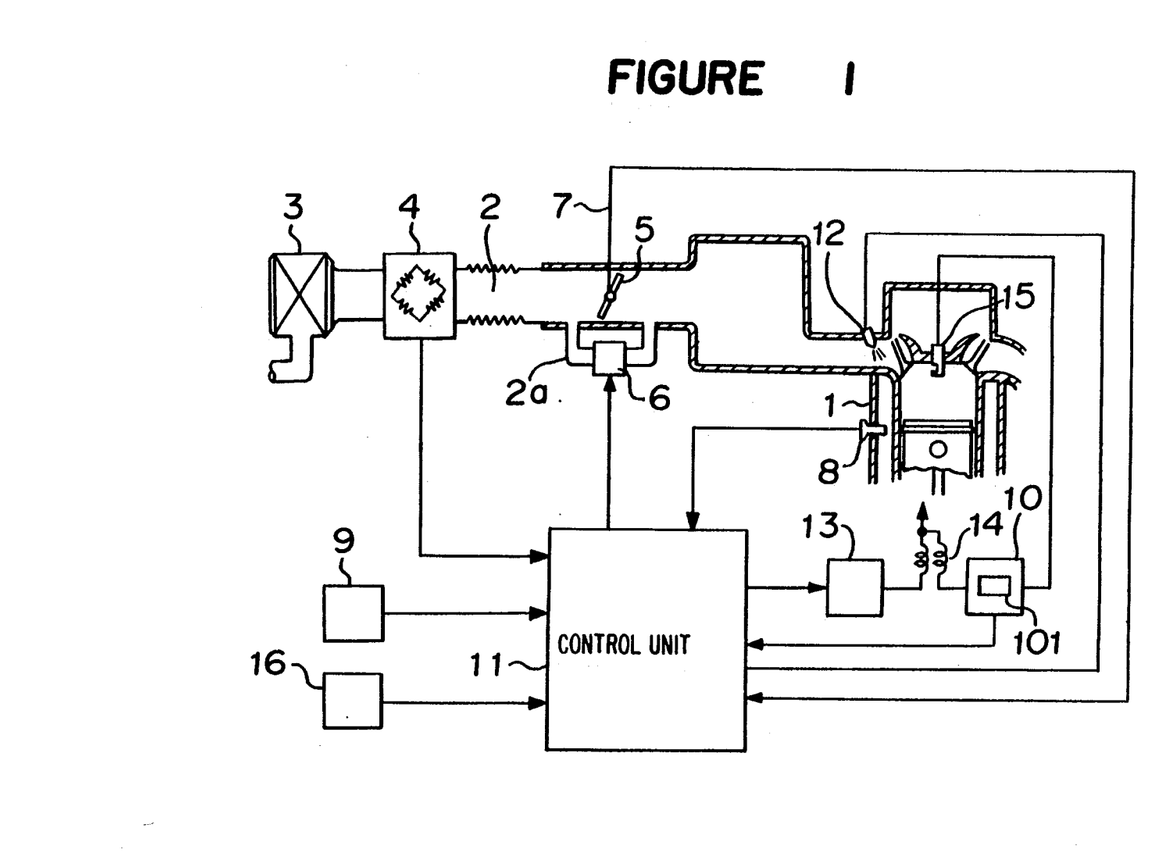
FIG. 1 is a construction diagram of the invented device.

An embodiment of the present invention will be explained referring to the drawings as follows. FIG. 1 shows the construction of the embodiment of the electronic control device for an internal combustion engine, wherein a reference numeral 1 designates an engine, 2, an intake pipe connected to the engine 1, 3, an air cleaner provided at an entrance of the intake pipe 2, 4, an intake quantity sensor, 5, a throttle valve, 2a, a by-pass pipe connected to the intake pipe 2 on the upstream and the downstream sides of the throttle valve 5, 6, a bypass control valve provided at the bypass pipe 2a, 7, a throttle opening degree sensor for detecting an opening degree of the throttle valve 5, 8, a temperature sensor for detecting an engine temperature, 9, a starting switch for detecting a starting state of the engine 1, and 10, a distributor incorporating a crank angle sensor 101, which supplies a high-tension voltage to an ignition plug 15. The crank angle sensor 101 detects an engine revolution number. A reference numeral 16 designates a fuel property sensor, which outputs an output signal corresponding to an index of refraction of fuel and a fuel temperature signal to a control unit 11. A numeral 12 designates an injector, 13, an igniter and 14, an ignition coil.

The control unit 11 receives output signals of the respective sensors 4, 7, 8, 16 and 101 and the starting switch 9, performs a fuel control by driving the injector 12, controls an electricity flowing time of the ignition coil 14 and the ignition timing by controlling the igniter 13, and performs an idling revolution number control (control for air quantity in idling) by driving the bypass control valve 6.

Figure 2:
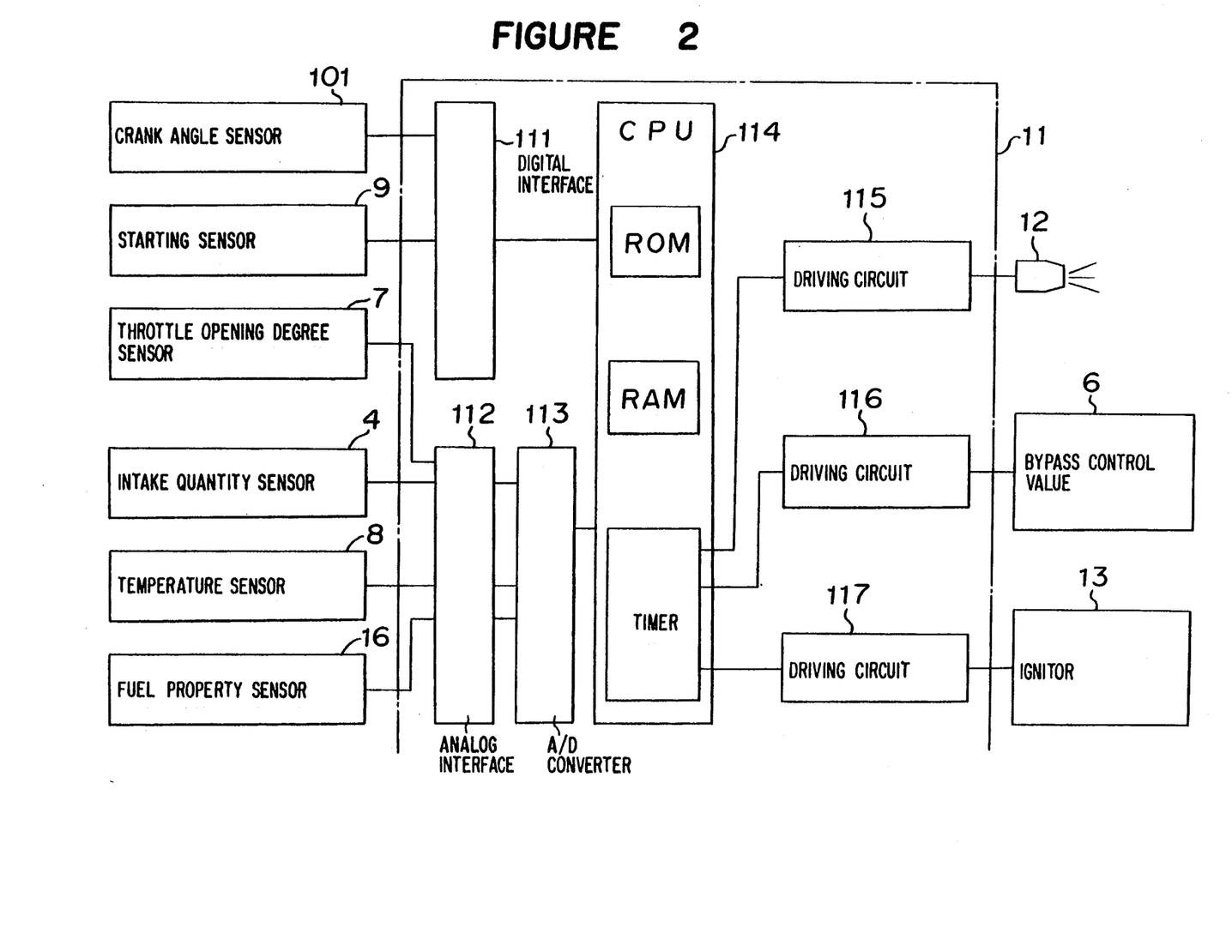
FIG. 2 is a construction diagram of a control unit of the invented device.

FIG. 2 shows the construction of the control unit 11. A digital interface 111 is a circuit which inputs digital signals from the crank angle sensor 101 and the starting switch 9 to a CPU 114. An analog interface 112 is a circuit which inputs analog signals from the throttle opening degree sensor 7, the intake quantity sensor 4, the temperature sensor 8 and the fuel property sensor 16 to an A/D convertor 113. The A/D convertor 113 converts these inputs and inputs them to the CPU 114. The CPU 114 incorporates a ROM, a RAM, a timer and the like, and controls driving circuits 115 through 117 based on the respective input signals. The driving circuits 115 through 117 respectively drive the injector 12, the bypass control valve 6 and the igniter 13.

Figure 3:
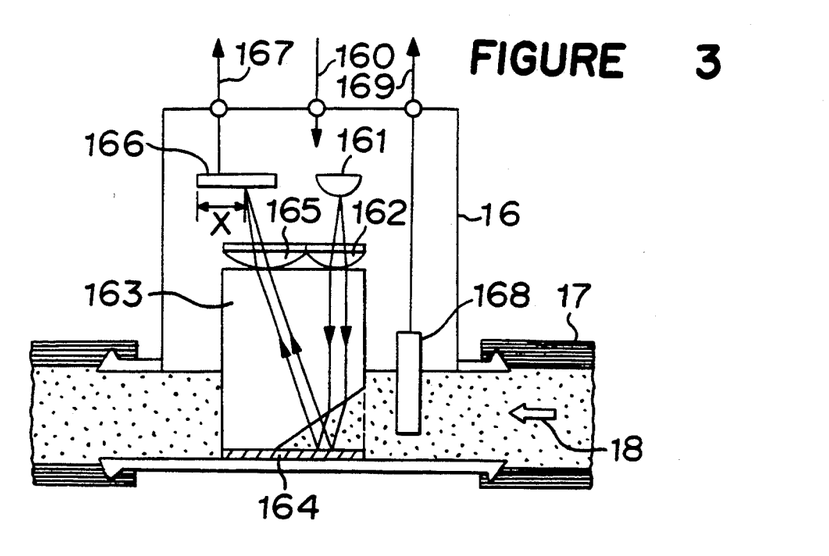
FIG. 3 is a construction diagram of a fuel property sensor of the invented device.

FIG. 3 designates the construction of the fuel property sensor 16. The fuel property sensor 16 is provided at a fuel pipe 17. An arrow mark 18 designates the direction of flow of fuel. A reference numeral 160 designates a power source input, 161, a light emitting diode (LED), 162, a collimating lens which converts a beam from the light emitting diode 161 into a parallel ray, and 163, a rod prism. The beam which passes through the rod prism 163 is refracted in accordance with a ratio of indices of refraction of both the prism and the fuel at an interface of the prism and the fuel, and thereafter, reflected by a reflector 164, refracted again at the interface, and is converged on a PSD (one-dimensional position detecting element) 166 by a condenser lens 165.

Accordingly, a converging position on the PSD 166 is determined in accordance with the index of refraction of the fuel. An output voltage 167 is obtained by converting a photoelectric current of the PSD 166 into a voltage. Since the index of refraction of the fuel is influenced by a fuel temperature, a correction by the fuel temperature is necessary. Therefore, a fuel temperature sensor 168 is provided in the fuel pipe 17 by which the fuel temperature signal is obtained.

Figure 4:
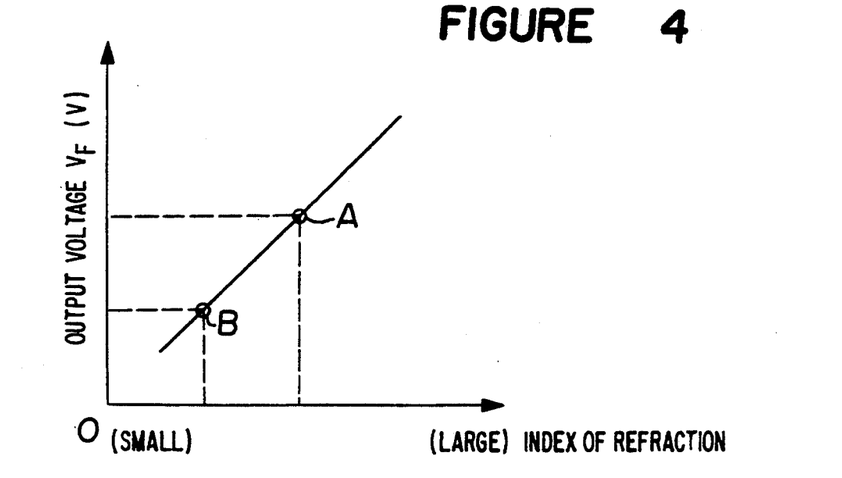
FIG. 4 is an output characteristic diagram with respect to an index of refraction of the fuel property sensor of the invented device.
Figure 5:
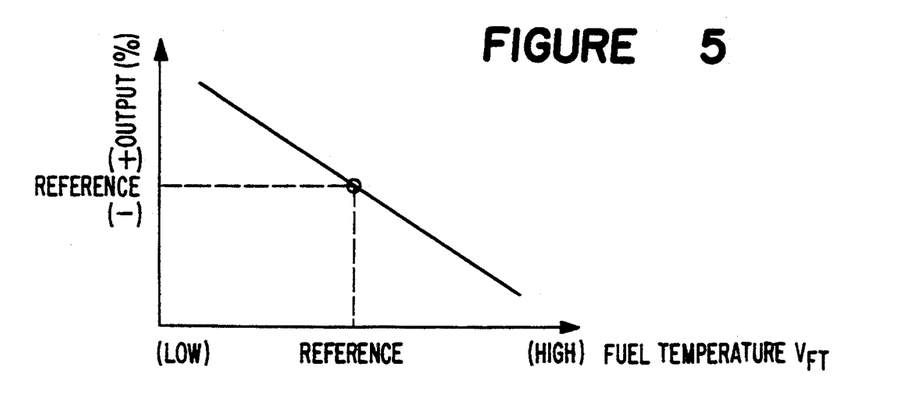
FIG. 5 is an output characteristic diagram with respect to a fuel temperature of the fuel property sensor of the invented device.
Figure 6A:
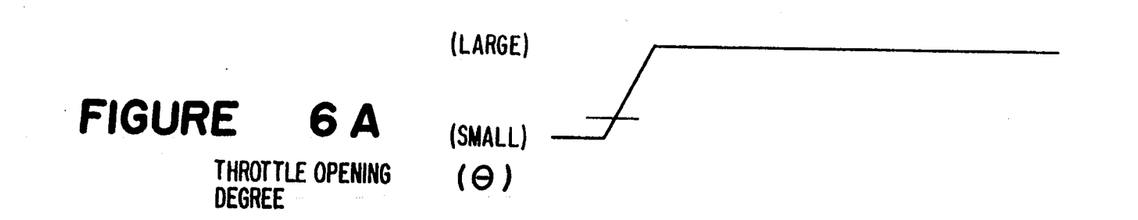
FIGS. 6A through 6D are time charts showing the operation of a first embodiment of the invented device in acceleration time of an engine.
Figure 6B:
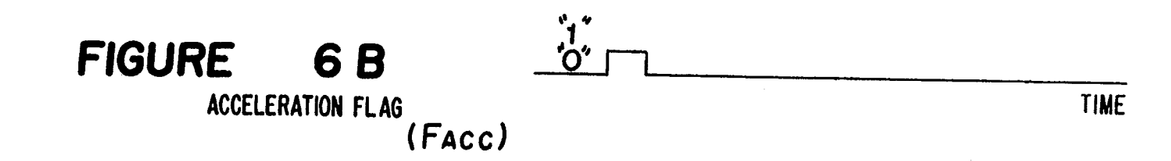
Figure 6C:
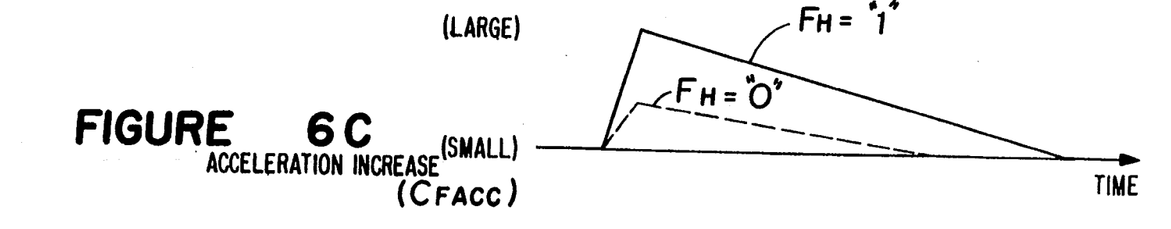
Figure 6D:
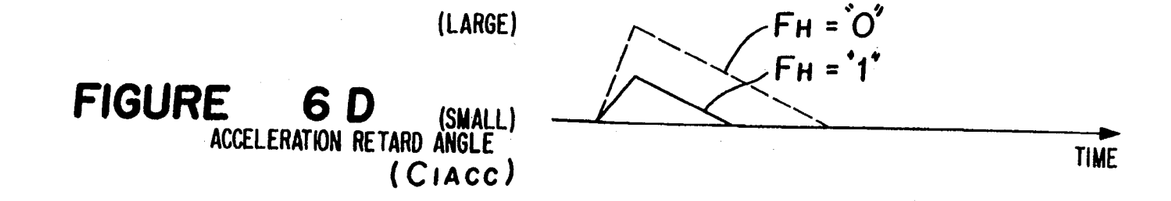

FIG. 4 shows an output characteristic with respect to index of refraction of the fuel property sensor 16. The case of the normal gasoline is shown at point B, and the case of heavy gasoline, point A. This is because the index of refraction of gasoline has a relationship with the specific weight of gasoline, and the specific weight has a relationship with the octane value of the gasoline. FIG. 5 shows the relationship between an output of the fuel property sensor 16 and the fuel temperature $V_{FT}$.

For instance, when the fuel temperature is higher than a reference value, the output voltage is lower than the reference value. Accordingly, the influence of the fuel temperature can be removed by correcting the output with respect to a difference with the reference value, in accordance with the characteristic in FIG. 5.

FIGS. 6A through 6D are time charts showing the operation of the example of the electronic control device during the acceleration time period, which explain the operation thereof limited to a case of an acceleration increase control in the fuel quantity control, and a case of an acceleration retard angle quantity control in the ignition timing control. The detailed operation will be explained by a flowchart in FIG. 8. In the acceleration of the engine, the throttle opening degree changes from "small" to "large", and during this acceleration period, an acceleration flag $F_{ACC}$ is set. Furthermore, an acceleration increase $C_{FACC}$ of the fuel is increased during the acceleration period, and thereafter, gradually decreases. $F_H$ is a determination flag in accordance with the fuel property which is determined by the fuel property sensor 16, wherein $F_H=0$ corresponds to a light gasoline, and $F_H=1$, a heavy gasoline. In case of the heavy gasoline, the acceleration increase is more enhanced than that in the light gasoline. Furthermore, in case of the ignition timing control, the acceleration retard angle is increased, during the acceleration period, and thereafter gradually reduced. This acceleration retard angle is more reduced in the heavy gasoline than that in the light gasoline.

Figure 7:
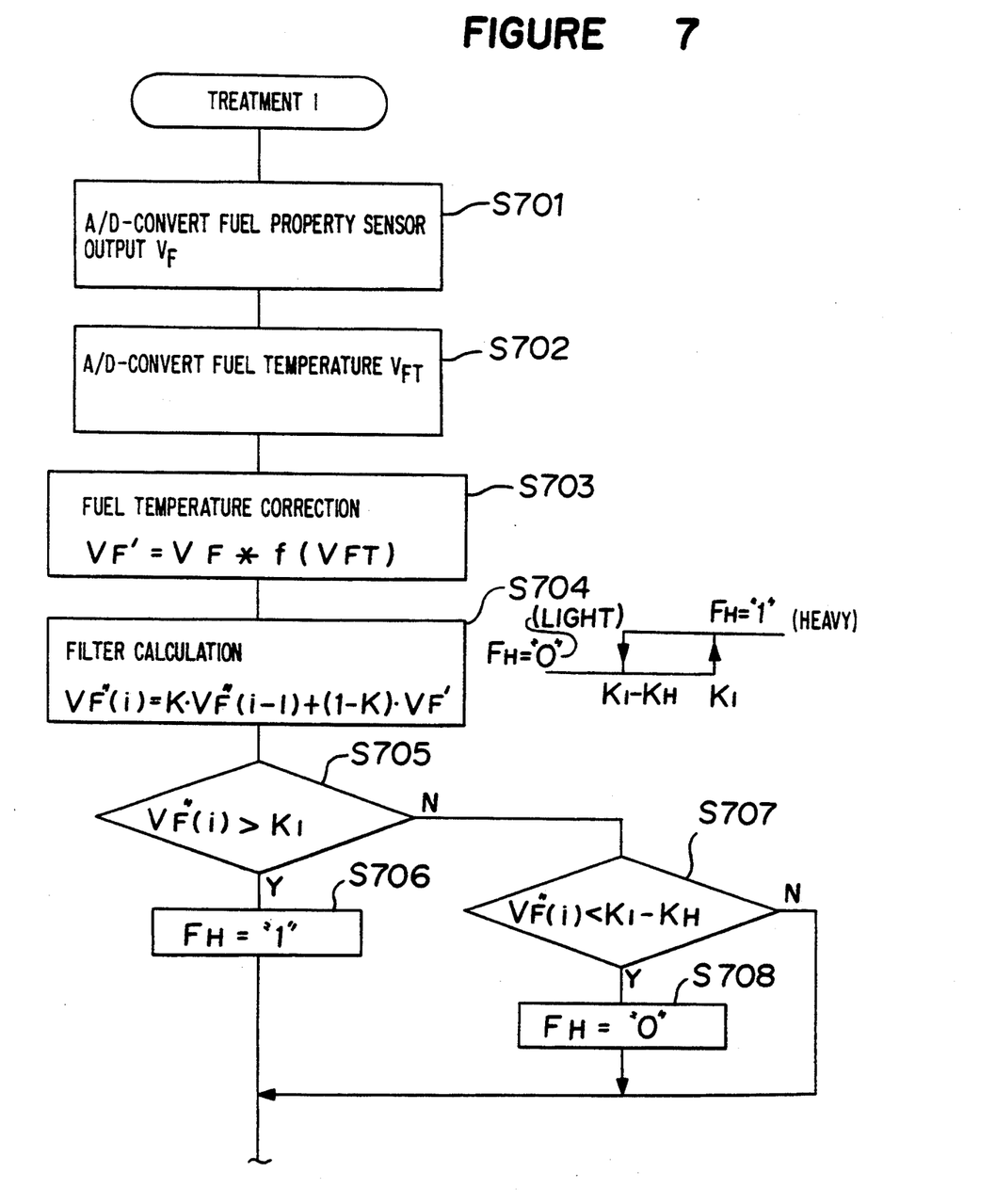
FIG. 7 is a flowchart showing the operation of the fuel property sensor of the invented device.

FIG. 7 illustrates a procedure for determining the difference between the heavy gasoline and the light gasoline by the fuel property sensor 16. In step S701, an output of the fuel property sensor 16 is converted to a digital signal by the A/D converter, and a data $V_F$ is obtained. Next, the fuel temperature signal from an output of the fuel property sensor 16 is converted to a digital signal, and a data $V_{FT}$ is obtained. In step S703, the operation corrects the data $V_F$ into an output corresponding with a reference temperature, based on the property in FIG. 5. Assuming the corrected value as $V_F'$, $V_F' = V_F * f(V_{FT})$.

Next, in step S704 the operation performs a filter treatment with respect to the corrected value $V_F'$. Since the fuel property does not change frequently, a noise removal is performed with respect to the output. Assuming K as $0 < K < 1$, $V_F''(i) = KV_F''(i-1) + (1-K)V_F'$ signifies a primary filter treatment. $V_F''$ is an output after the filter treatment. In step S705, the operation compares $V_F''$ with a determinant $K_1$. When the $V_F'' > K_1$, the operation determines that the gasoline is a heavy gasoline and determines $F_H$ as $F_H=1$, in step S706. Furthermore, when $V_F''$ is not $V_F'' > K_1$, the operation determines whether $V_F''(i) < K_1 - K_H$ ($K_H$ is a hysteresis value) in step S707. When YES, the operation determines that the gasoline is a light gasoline, and determines $F_H$ as $F_H=0$, in step S708. When NO, the operation does not perform the determination. The hysteresis value $K_H$ is included in the above equation for stabilization of the control operation.

Figure 8:
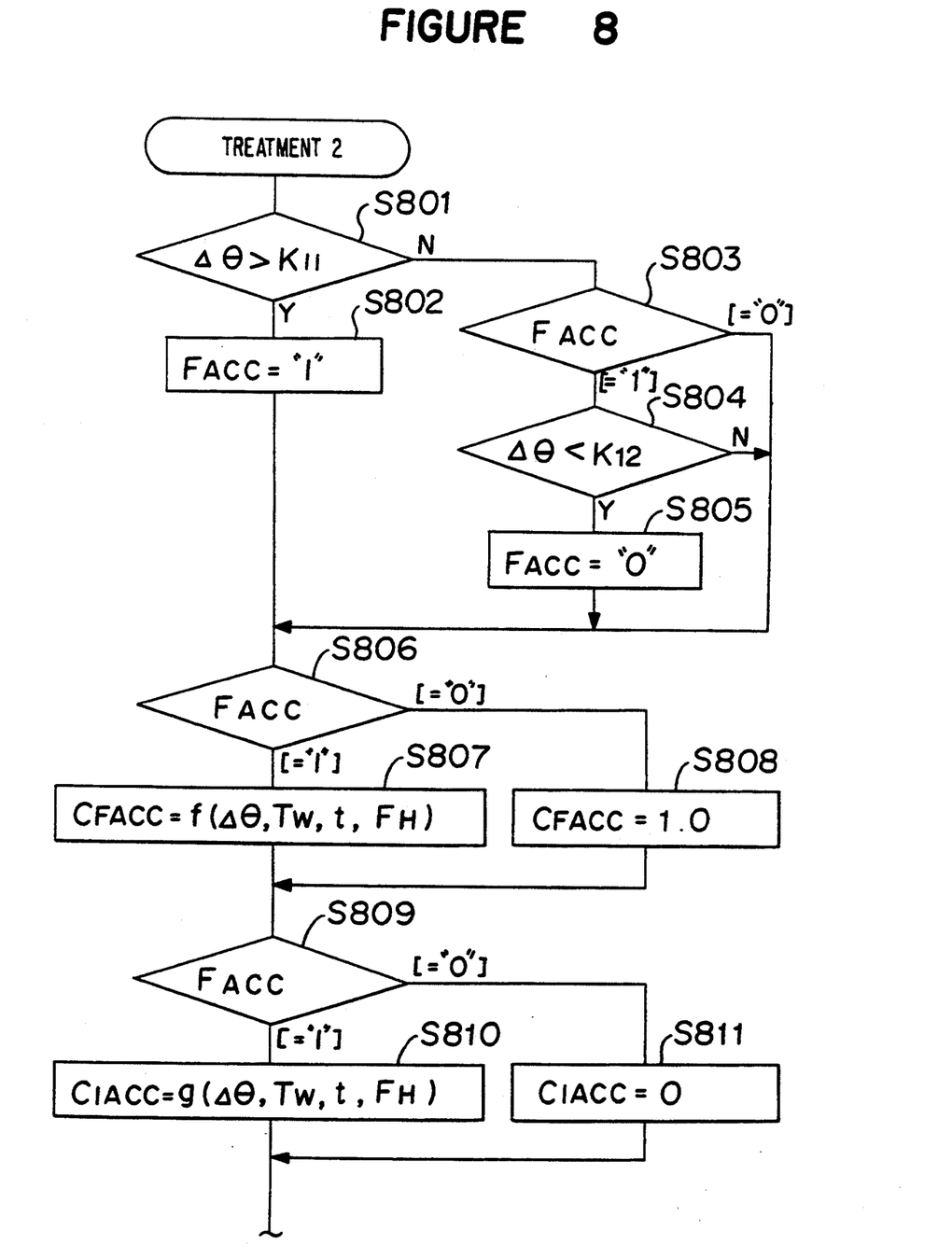
FIG. 8 is a flowchart showing the operation of the first embodiment of the invented device in the acceleration time.

FIG. 8 is a flowchart showing a detailed operation of the above embodiment. The procedure from step S801 to S805 is an acceleration determining procedure based on a throttle opening degree $\theta$. $\Delta\theta$ is a change quantity of the throttle opening degree $\theta$, and $\Delta\theta = \Delta\theta_i - \Delta\theta_{i-1}$, where "i" corresponds to a predetermined sampling time.

In step S801, the operation compares $\Delta\theta$ with a predetermined value $K_{11}$. When $\Delta\theta > K_{11}$, the operation determines that the engine is in an acceleration state, and proceeds to step S802, and sets the acceleration flag $F_{ACC}$. When $\Delta\theta$ is not $\Delta\theta > K_{11}$, the operation proceeds to step S803, and a determination is made as to whether the acceleration flag $F_{ACC}$ which is determined at a preceding time, is 0 or 1. When $F_{ACC}=1$, or when the acceleration flag is set, the operation proceeds to step S804, and determines whether a reset condition $\Delta\theta < K_{12}$ ($K_{12}$ is a predetermined value) of the acceleration flag $F_{ACC}$, is established. When the reset condition is established, the operation proceeds to step S805 and resets the acceleration flag $F_{ACC}$. When it is not established, the operation proceeds to step S806.

The procedure of steps S806 through S808 is a routine for determining the acceleration fuel increase quantity. In step S806, the operation determines whether $F_{ACC}$ is 1 or 0. When $F_{ACC}$ is 1, the operation proceeds to S807, and calculates an acceleration increase $C_{FACC}=f(\Delta\theta, T_W, t, F_H)$, where $T_W$ is an engine temperature, and "t" is a time period from when the acceleration flag $F_{ACC}$ is set. $C_{FACC}$ is modified depending on whether $F_H$ is 1 or 0 as in FIG. 6C. When $F_H=0$, the operation proceeds to step S808, and determines the acceleration increase $C_{FACC}$ as a reference value of 1.0. The acceleration increase $C_{FACC}$ is corrected by multiplying it to a basic fuel quantity obtained by a well-known means.

The procedure of steps S809 through S811 is a routine for determining an ignition retard quantity in the acceleration time. In step S809, the operation determines whether the acceleration flag $F_{ACC}$ is 1 or 0. When the acceleration flag is 1, the operation proceeds to step S810, and calculates an acceleration retard angle $C_{IACC}=g(\Delta\theta, T_W, t, F_H)$. When $F_{ACC}=0$, the operation proceeds to step S811, and determines $C_{IACC}$ as $C_{IACC}=0$. The acceleration retard quantity $C_{IACC}$ is added to a basic ignition timing obtained by a well-known means.

EXAMPLE 2

FIGS. 9A through 9G are time charts showing the operation of a second embodiment of an electronic control device at starting and at post-starting of an engine, which explains the operation limited to a starting fuel quantity, an idling air quantity, a post-starting fuel correction value, a post-starting ignition timing correction value, and an idling air quantity correction value. A detailed explanation will be given by FIG. 10. First, when the starting switch 9 is switched to ON at starting of the engine and the engine is in a starting state, a value is set to a post-starting counter $C_{STT}$. The post-starting counter $C_{STT}$ is a counter which, instantly after starting, is gradually decreased to 0 corresponding with time period after the starting switch 9 is switched to OFF, and a post-starting state is detected by this value.

The fuel quantity and the idling air quantity at starting are made constant values in accordance with the engine temperature, and the values are switched depending on whether the flag $F_H$ in accordance with the fuel property is 1 or 0. In case of a heavy gasoline of $F_H=1$, both of the fuel quantity and the idling air quantity are increased more than in case of a light gasoline of $F_H=0$.

Next, in the post-starting state after the starting switch 9 is switched to OFF, the fuel correction value, the ignition timing correction value and the air quantity correction value at post-starting which are obtained by the engine temperature and the value of the fuel property determining flag $F_H$ at starting, are gradually decreased instantly after the starting, in accordance with the value of the counter $C_{STT}$. These respective correction values at post-starting are changed by the value of the flag $F_H$. In the case of a heavy gasoline both the fuel quantity and the idling air quantity are greater than in light gasoline, and the ignition timing is set to an advance angle side. Furthermore, in case of the light gasoline of $F_H = 0$, the ignition timing at post-starting is not controlled to the advance angle, and is controlled to the advance angle only in case of the heavy gasoline.

Figure 10:
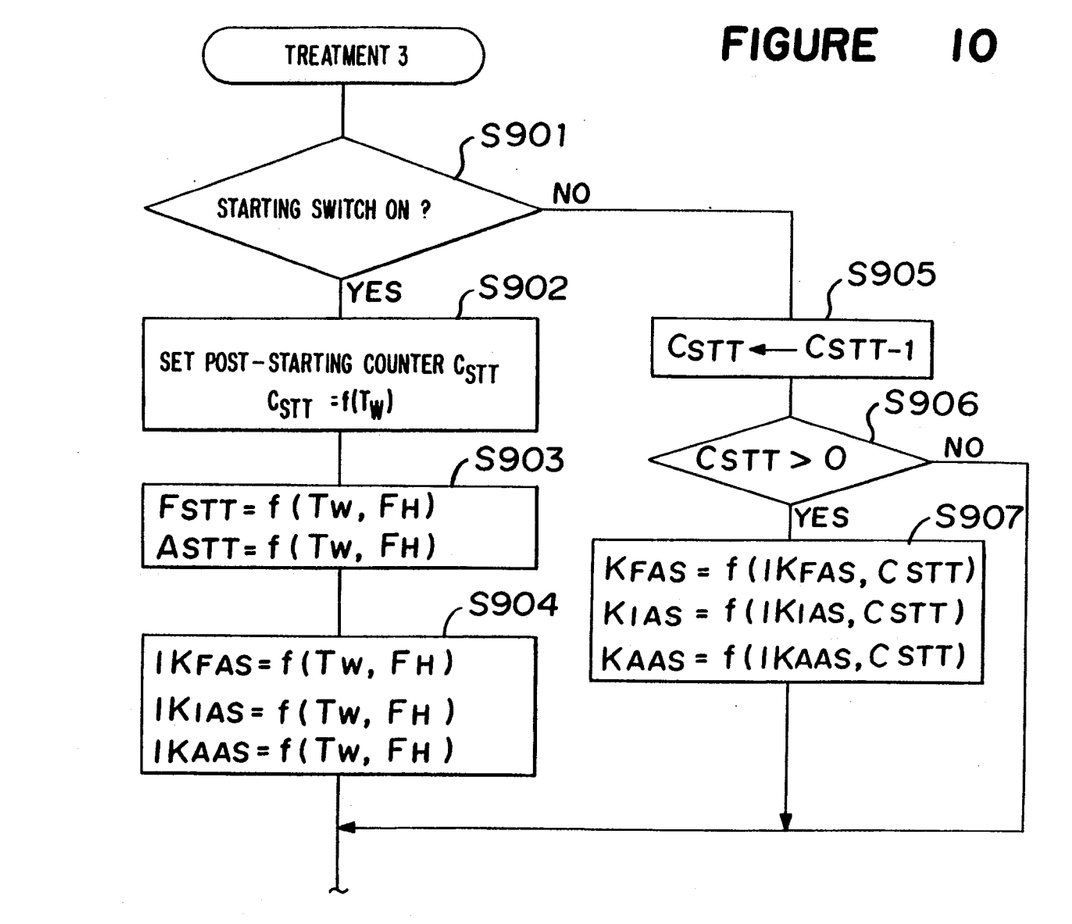
FIG. 10 is a flowchart showing the operation of the second embodiment of the invented device at starting and at post-starting.

FIG. 10 is a flowchart showing a detailed operation of the second embodiment. The program is previously memorized in a ROM in CPU 14. When the power is supplied by turning the key switch ON, the procedure is repeated at every predetermined time, for instance, 5 msec. In step S901, the operation determines whether the starting switch 9 is switched to ON or not. When the starting switch 9 is turned to ON, and the engine is in the starting state, the operation proceeds to step S902, and sets a value of $f(T_W)$ which is set in accordance with the engine temperature $T_W$, to the counter $C_{STT}$ for determining the post-starting state.

Next, in step S903, the operation sets a fuel quantity $F_{STT}$ and an idling air quantity $A_{STT}$ at starting, in accordance with the engine temperature $T_W$ and the fuel property determining flag $F_H$. Next, in step S904, the operation respectively sets initial correction values $IK_{FAS}$, $IK_{IAS}$, $IK_{AAS}$ of the fuel quantity, the ignition timing and the idling air quantity at post-starting, in accordance with engine temperature $T_W$ and the determining flag $F_H$. These initial correction values are only calculated at starting, and are not reflected to the actual control. Although explanation at next successive steps are omitted here, the ignition timing set value at starting or the like is calculated and the fuel quantity, the ignition timing and the idling air quantity are controlled by outputting signals to the injector 12, the igniter 13 and the bypass control valve 6.

Figures 9A, 9B, 9C, 9D, 9E, 9F, 9G:
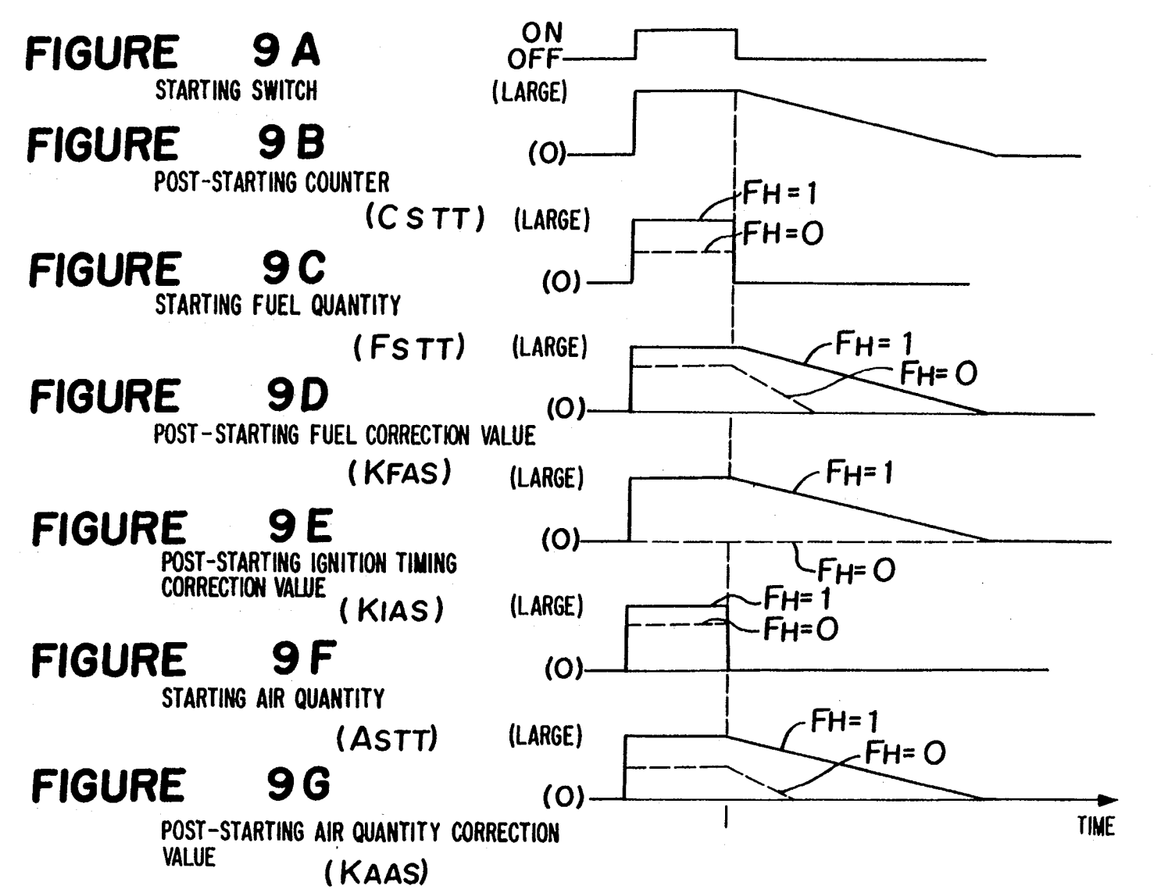
FIGS. 9A through 9G are time charts showing the operation of a second embodiment of the invented device at starting and at post-starting.

Next, when the starting switch 9 is determined as OFF in step S901, the operation proceeds to step S905, and subtracts the value of the counter $C_{STT}$ at post-starting, by 1. In step 906, the operation determines whether the counter $C_{STT}$ after post-starting, is larger than 0. When it is larger than 0, the operation determines that the engine is in the running state at post-starting and proceeds to step S907. In step S907, the operation gradually reduces initial correction values of the fuel quantity, the ignition timing and the idling air quantity at post-starting which are calculated in step S904 in accordance with the value of the counter $C_{STT}$, as shown in FIGS. 9D, 9E and 9G. These correction values are added or multiplied to the basic fuel quantity, the basic ignition timing and the basic idling air quantity, in the omitted successive steps, by which a final fuel quantity obtained by well-known procedures, ignition timing and idling air quantity are obtained, which are outputted to the injector 12, the igniter 13 and the bypass control valve 6, as in the starting time, thereby controlling the fuel quantity, the ignition timing and the idling air quantity.

Furthermore, in step S906 when the operation determines that the counter $C_{STT}$ at post-starting as 0, the operation determines that the running state at the post-starting is finished, and controls the fuel quantity, the ignition timing and the idling air quantity based on the basic values calculated at the successive steps.

As stated above according to the present invention, since the fuel quantity, the ignition timing and the idling air quantity are corrected according to the fuel property in the acceleration state of the engine or at the starting or at post-starting, the starting incapacitance or the termination of engine operation instantly after the starting is prevented.

What is claimed is:

1. An electronic control device for an internal combustion engine having running condition detecting means for detecting a running state of an engine, which controls at least one of a fuel quantity and an ignition timing of the engine in accordance with the running state, wherein a single fuel is supplied to said internal combustion engine, said electronic control device comprising:

acceleration detecting means for detecting an acceleration state of the engine;

fuel property detecting means for detecting a specific weight of said fuel for characterizing said fuel as one of a heavy fuel and a light fuel based upon an index of refraction of said fuel and a temperature of said fuel; and correcting means for correcting at least one of the fuel quantity and the ignition timing in accordance with the specific weight of said fuel under the acceleration state.

2. An electronic control device for an internal combustion engine having running condition detecting means for detecting a running state of an engine, which controls at least one of a fuel quantity, an ignition timing, and an air quantity in idling time of an engine in accordance with the running state, wherein a single fuel is supplied to said internal combustion engine, said electronic control device comprising:

detecting means for detecting a starting state of the engine;

fuel property detecting means for detecting a specific weight of said fuel for characterizing said fuel as one of a heavy fuel and a light fuel based upon an index of refraction of said fuel and a temperature of said fuel; and correcting means for correcting at least one of the fuel quantity, the ignition timing, and the air quantity in idling time in accordance with the specific weight of said fuel during the starting state of the engine.

3. An electronic control device for an internal combustion engine having running condition detecting means for detecting a running state of an engine, which controls at least one of a fuel quantity, an ignition timing, and an air quantity in idling time of an engine in accordance with the running state, wherein a single fuel is supplied to said internal combustion engine, said electronic control device comprising:

detecting means for detecting a post-starting state of the engine;

fuel property detecting means for detecting a specific weight of said fuel for characterizing said fuel as one of a heavy fuel and a light fuel based upon an index of refraction of said fuel and a temperature of said fuel; and correcting means for correcting at least one of the fuel quantity, the ignition timing, and the air quantity in idling time in accordance with the specific weight of said fuel during the post-starting state of the engine.

* * * * *